(12) United States Patent
Chen et al.

(10) Patent No.: US 10,990,534 B2
(45) Date of Patent: Apr. 27, 2021

(54) DEVICE, SYSTEM AND METHOD TO FACILITATE DISASTER RECOVERY FOR A MULTI-PROCESSOR PLATFORM

(71) Applicant: Intel Corporation, Santa Clara, CA (US)

(72) Inventors: Wei Chen, Portland, OR (US); Eswaramoorthi Nallusamy, Cedar Park, TX (US); Larisa Novakovsky, Haifa (IS); Mark Schmisseur, Phoenix, AZ (US); Eric Rasmussen, Chelmsford, MA (US); Stephen Van Doren, Portland, OR (US); Yen-Cheng Liu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 155 days.

(21) Appl. No.: 16/264,447

(22) Filed: Jan. 31, 2019

(65) Prior Publication Data
US 2019/0171575 A1 Jun. 6, 2019

(51) Int. Cl.
| | |
|---|---|
| *G06F 12/08* | (2016.01) |
| *G06F 12/0891* | (2016.01) |
| *G06F 12/0802* | (2016.01) |
| *G06F 12/02* | (2006.01) |

(52) U.S. Cl.
CPC ...... *G06F 12/0891* (2013.01); *G06F 12/0246* (2013.01); *G06F 12/0802* (2013.01); *G06F 2212/7205* (2013.01)

(58) Field of Classification Search
CPC ............ G06F 12/0246; G06F 12/0802; G06F 12/0891; G06F 2212/1032; G06F 2212/7205
USPC ................................ 711/118, 121, 135, 162
See application file for complete search history.

(56) References Cited

U.S. PATENT DOCUMENTS

| | | | | |
|---|---|---|---|---|
| 7,421,552 B2 * | 9/2008 | Long | ................... | G06F 11/1441 711/103 |
| 8,583,865 B1 * | 11/2013 | Sade | ................... | G06F 12/0811 711/113 |
| 9,021,297 B1 * | 4/2015 | Hayes | .................. | G06F 12/0246 714/6.3 |
| 2006/0106990 A1 * | 5/2006 | Benhase | ............. | G06F 12/0866 711/135 |

* cited by examiner

*Primary Examiner* — Gary J Portka
(74) *Attorney, Agent, or Firm* — Green, Howard & Mughal LLP.

(57) ABSTRACT

Techniques and mechanisms for capturing an image of processor state at one node of multiple nodes of a multi-processor platform, where the processor state includes some version of data which the node retrieved from another node of the platform. In an embodiment, a disruption of power is detected when a processor of a first node has a cached version of data which was retrieved from a second node. In response to detection of the disruption, the data is saved to a system memory of the first node as part of an image of the processor's state. The image further comprises address information, corresponding to the data, which indicates a memory location at the second node. In another embodiment, processor state is restored during a boot-up of the node, wherein the state includes the captured version of data which was previously retrieved from the second node.

22 Claims, 12 Drawing Sheets

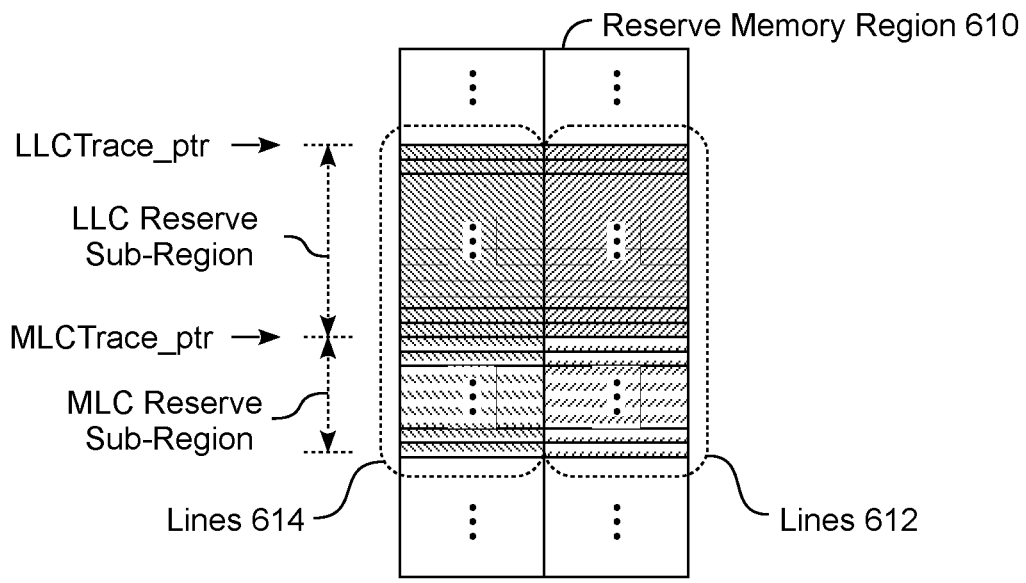
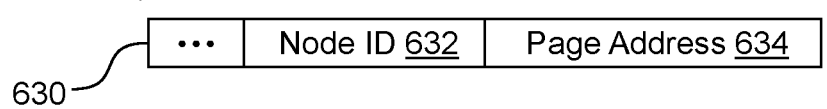
FIG. 6

DEVICE, SYSTEM AND METHOD TO FACILITATE DISASTER RECOVERY FOR A MULTI-PROCESSOR PLATFORM

BACKGROUND

1. Technical Field

The present invention relates to computer systems and more particularly, but not exclusively, to the recovery of processor state in a multi-node computer system.

2. Background Art

High Performance Computing (HPC) and cluster computing involve connecting individual computing nodes to create a distributed system capable of solving complex problems. Traditionally, these nodes have been individual desktop computers, servers, or similar machines capable of hosting an individual instance of computation. More recently, the evolution of datacenters, and the drive towards exascale high-performance computing, has resulted in a long term platform trend towards increased node density, wherein multiple nodes are disposed on a common board, in the same package or even on the same semiconductor substrate. Some of these platforms provide a distributed computing architecture wherein multiple processing nodes are able to variously access each other's respective memories.

The architecture of a given computing platform typically has a direct impact on the time needed to implement a system shut-down and/or a system boot. Usually, platforms having a multi-node (or other multi-processor) architecture are particularly constrained in this regard. As a result, the performance of multi-node systems is highly sensitive to interruptions in power delivery.

As multi-node computer architectures continue to grow in number, variety and capability, there is expected to be an increasing premium placed on incremental improvements to techniques for efficiently stopping and/or resuming operation of such architectures.

BRIEF DESCRIPTION OF THE DRAWINGS

The various embodiments of the present invention are illustrated by way of example, and not by way of limitation, in the figures of the accompanying drawings and in which:

FIG. 6 illustrates the structure of memory map information and address information which is accessed to support disaster recovery according to an embodiment.

DETAILED DESCRIPTION

Figure 1:
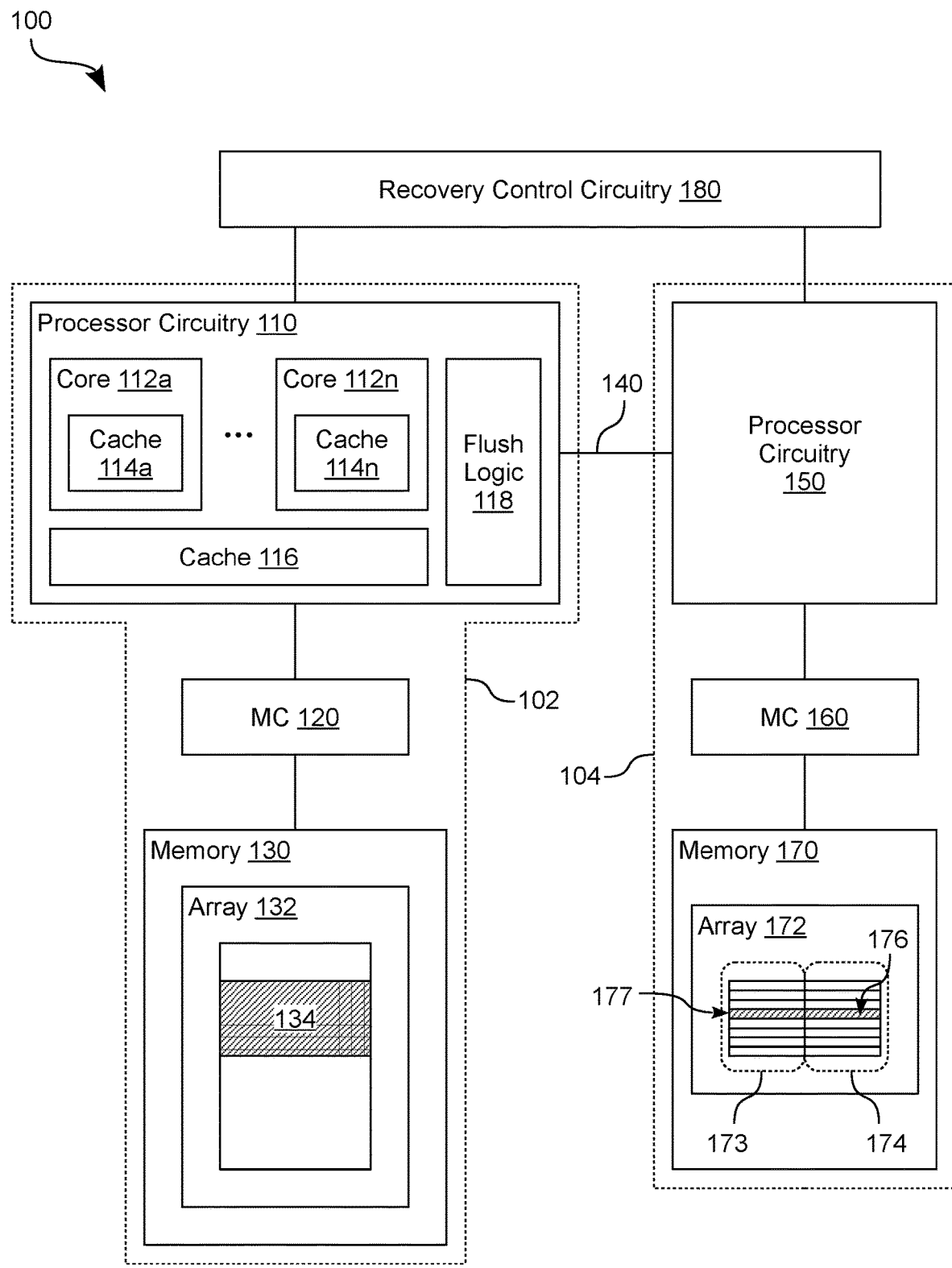
FIG. 1 is a functional block diagram illustrating elements of a multi-node system to capture an image of processor state according to an embodiment.

Embodiments discussed herein variously provide techniques and mechanisms for capturing an image of processor state at one node of multiple nodes of a multi-processor platform, where the processor state includes some version of data which that node retrieved from another node of the multi-processor platform. In an embodiment, the captured image is available to be subsequently retrieved from a system memory of the node—e.g., to enable a recovery of the processor state after a restart of the multi-processor platform.

"Disaster recovery" refers generally to any of various techniques which enable at least some processing state of a computing system to be restored after a shut-down or other process that would otherwise require, or at least risk, the loss of such state. Traditionally, disaster recovery has been understood to involve writing cached data back to a system memory location from which that data (or at least some earlier version thereof) was previously retrieved. For example, in various multi-node architectures, a processor of one node is able to access and operate on data which has been retrieved from a memory resource (e.g., a DRAM or a non-volatile memory) of another node which is coupled thereto. In these architectures, conventional disaster recovery has included, or otherwise been supported by, such data being communicated back to the originating node, for storage at the original memory location thereof, before a system shut-down or other such process can take place.

Some embodiments variously provide efficiencies over such conventional disaster recovery techniques at least insofar as they avoid or otherwise mitigate latencies associated with inter-node communications in support of disaster recovery. For example, in some embodiments, circuitry supports operation of a node in a multi-node architecture of a multi-processor platform, where the node is able to detect an actual or expected power disruption, where such detection occurs while the node has a cached (and, for example, modified) version of some data which was previously retrieved from a memory of a different node. Based on the detection of the power disruption, the circuitry facilitates the capturing of information (referred to herein as "processor state information") which represents an image of at least some state of data processing by the node. In this particular context, the term "state," as used herein, is understood to include some, but not necessarily all, information about the status of a processor. For example, captured processor state information represents, in some embodiments, a state of at least some cache memory of a processor. Although some embodiments are not limited in this regard, captured processor state further comprises (for example) additional state information other than that for a processor cache—e.g., wherein the captured processor state also includes that for one or more configuration registers, one or more internal state machines, and/or other processor circuitry. In an embodiment, capturing an image of data processing state comprises flushing one or more caches of a node to a reserved region (or regions) of a system memory of the node. Included in the flushing is the cached version of data which the node retrieved from another node—e.g., wherein such cached data (and corresponding address information) is written to the reserve memory region of the node in lieu of such data being sent, via an inter-node link, for storage in an associated memory location at another node.

The term "node" refers herein to any of various combinations of circuit resources which comprise a processor, a memory coupled thereto, and interface hardware which facilitates direct or indirect communication with a similar combination of circuit resources. In some embodiments, a multi-processor platform provides a multi-node architecture—e.g., wherein a node supports operation with another node in a single data coherency domain which is common to said nodes. As used herein, "image" refers to information (e.g., including data and address information which corresponds to such data) which describes at least in part a state of data processing by a processor—e.g., wherein the image is to facilitate a restoration of said state after a system reboot. The process of storing such processor state information is referred to as "image capture."

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices which include or otherwise implement at least in part a multi-node computing architecture.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

It is pointed out that those elements of the figures having the same reference numbers (or names) as the elements of any other figure can operate or function in any manner similar to that described, but are not limited to such.

FIG. 1 shows features of a system 100 to capture an image of processor state according to an embodiment. System 100 is one example of an embodiment wherein a multi-processor platform provides a multi-node architecture, where a processor of a first node is configured to operate on data which is retrieved from a second node, and where, in response to the detection of a power disruption event, the data is saved to a system memory of the first node as part of an image of the processor's state. The image further comprises address information, corresponding to the data, which indicates a memory location at the second node—e.g., wherein the address information comprises a virtual address corresponding to a physical address of said memory location.

As shown in FIG. 1, system 100 includes nodes 102, 104 which are coupled to one another via interconnect circuitry (such as the illustrative interconnect 140 shown). In some embodiments, a single computer platform includes both of nodes 102, 104—e.g., wherein nodes 102, 104 are disposed in the same packaged device or (alternatively) are variously disposed in different respective packaged devices of the same computer platform. In one example embodiment, one or more integrated circuit (IC) chips of a packaged device include some or all circuitry of node 102, wherein another one or more IC chips of that same packaged device include some or all circuitry of node 104. Alternatively or in addition, one IC chip includes (for example) at least some circuitry of node 102 and at least some other circuitry of node 104. In other embodiments, nodes 102, 104 are variously provided by different respective computer platforms (e.g., different respective servers) which are networked with each other.

Interconnect 140 comprises any of various buses and/or other suitable interconnect circuitry including, for example, a UltraPath Interconnect (UPI) link, a QuickPath Interconnect (QPI) link or the like. In one embodiment, interconnect 140 extends in a motherboard or other printed circuit board—e.g., between sockets (or other connector hardware) that each accommodate coupling to a respective packaged device which comprises one of nodes 102, 104. Alternatively, interconnect 140 provides electrical connectivity between different IC chips of a packaged device. Although interconnect 140 is shown as being coupled to processor circuitry 110 of node 102 and to processor circuitry 150 of node 104, various embodiments are not limited in this regard. For example, one or more additional or alternative interconnects (not shown) are coupled between other circuitry of nodes 102, 104, in various embodiments.

Node 102 comprises a first processor (which includes the illustrative processor circuitry 110 shown) and one or more memory resources—e.g., represented by memory 130—which are coupled to the first processor. One or more processor cores of the first processor each include a respective one or more caches—e.g., e.g., wherein processor cores 112a, . . . , 112n of processor circuitry 110 comprise respective caches 114a, . . . , 114n. Alternatively or in addition, processor circuitry 110 includes one or more other caches which are shared by some or all of cores 112a, . . . , 112n—e.g., wherein the illustrative cache 116 shown is available as a last layer cache (LLC) which supplements various data caching by caches 114a, . . . , 114n.

Cores 112a, . . . , 112n are variously provided with access to memory 130 via a memory controller MC 120 of node 102—e.g., wherein MC 120 is an integrated memory controller of the first processor, or (alternatively) is a memory controller which is distinct from, and coupled to, the first processor. In an embodiment, memory 130 comprises a volatile memory resource which, for example, includes a dynamic random access memory (RAM) or "DRAM," a static RAM (SDRAM) and/or the like. Alternatively or in addition, memory 130 comprises a non-volatile memory resource including, for example, a flash memory-based solid state drive (SSD), a phase-change RAM and/or the like. However, some embodiments are not limited to a particular memory cell type (or types) to be included in memory 130. In one example embodiment, memory 130 comprises one or more dual in-line memory modules (DIMMs)—e.g., where one such DIMM is a hybrid DIMM including one or more dual data rate (DDR) synchronous DRAM (SDRAM)

devices and one or more phase change RAM devices. An example phase change RAM device is one—such as a 3D XPoint device—which includes a three dimensional array of phase change memory elements.

Execution of a host operating system (OS) and/or other software with the first processor is based on, includes, and/or results in, one or more of cores 112a, . . . , 112n variously accessing data at one or more memory arrays of memory 130 (such as the illustrative array 132 shown). In an example embodiment, circuitry of core 112a functions as a processing pipeline which operates based on data which (for example) is read from memory 130. Cache 114a (and/or one or more other caches of core 112a) function as a repository to cache at least some version of such data prior to a final (e.g. modified) version of the data is written to a location in memory 130 from which an earlier version of said data was previously retrieved.

Additionally or alternatively, such software execution by the first processor is based on, includes, and/or results in, a core of the first processor accessing other data which is stored at a memory resource of node 104. Accordingly, one or more caches of the first processor are available to cache some version of data which is accessed from node 104—e.g., wherein the first processor includes or otherwise has access to an address translation mechanism which maintains an association of such data with one or more memory locations at node 104.

In the example embodiment shown, node 104 comprises a second processor (e.g., including processor circuitry 150) and one or more memory resources—represented as memory 170—which are coupled to the second processor. Similar to the first processor of node 102, the second processor of node 104 includes one or more processor cores (not shown)—e.g., where one or more caches of the second processor variously support software execution by such one or more processor cores. Processor circuitry 150 is provided with access to memory 170 via a memory controller MC 160 of node 104—e.g., wherein MC 160 is an integrated memory controller of the second processor, or (alternatively) is a memory controller which is distinct from, and coupled to, the second processor. Similar to memory 130, memory 170 includes any of a variety of combinations of one or more volatile memory devices and/or one or more non-volatile memory devices. Some embodiments are not limited to a particular memory cell type (or types) and/or a particular arrangement of memory resources of memory 170.

In the example embodiment shown, a memory array 172 of memory 170 includes lines 174 which are available to variously store data, wherein the locations of lines 174 each correspond to (and are identified by) a different respective one of addresses 173. At some time during operation of system 100, core 112a (and/or some other a processor core of node 110) performs a read of—or is otherwise provided with access to—data which, for example, is at a line 176 which corresponds to an address 177. While core 112a is operating based on such data from line 176—e.g., while cache 114a maintains a cached version of said data—some circuitry of system 100 detects an actual (or alternatively, an expected future) disruption of power delivery to and/or within system 100. In response to the detection of such a disruption, circuitry of node 102 initiates, controls, performs and/or otherwise facilitates operations to prepare for a system shut down or other such precautionary measure. These operations include capturing information which represents processor state for some or all of the one or more cores 112a, . . . , 112n.

For example, system 100 further comprises circuit logic (represented as recovery control circuitry 180) which is to monitor for any instance of one or more conditions which are predefined as being indicative of an actual or expected future power disruption. Recovery control logic 180 is coupled to signal some or all nodes of system 100 in response to such an instance being identified. Functionality of recovery control circuitry 180 is provided, for example, with a platform controller hub (PCH) of system 100. Some or all such functionality adapted, for example, from conventional disaster recovery techniques, which are not limiting on some embodiments, and which are not detailed herein to avoid obscuring certain features of various embodiments.

Responsive to an indication of a power disruption event (e.g., the indication provided by recovery control circuitry or by node 104), circuitry of node 102—represented by flush logic 118 of processor circuitry 110—performs operations to facilitate the writing to memory 130 of information which represents at least some processing state of processor circuitry 110. Such operations include ending one or more pipeline operations of cores 112a, . . . , 112n and/or terminating communications between nodes 102, 104 via interconnect 140. Alternatively or in addition, such operations include flushing some or all data from the caches of the first processor—e.g., where such data includes a cached version of data which node 102 previously retrieved from memory 170 of node 104. In the illustrative scenario shown, this cached data includes a cached (and, for example, modified) version of data which is previously retrieved from line 176 of array 172. Although shown as a single distinct functional block, some or all of flush logic 118 is distributed, in other embodiments, among variously ones of cores 112a, . . . , 114n, cache 116, MC 120, memory 130 and/or other circuitry of node 102.

In an embodiment, a predefined region of memory 130 (e.g., including the reserved region 134 of array 132) is allocated in advance—e.g., prior to the detection of a power disruption—as a dedicated repository for processor state information. For example, flush logic 118, MC 120 and/or other circuitry of the first processor variously include, have access to, or otherwise operate based on, a memory mapping which designates region 134 as a target for image capture (and, in some embodiments, as a source for image recovery). Such allocation prevents the use of reserved region 134 for one or more alternative types of data storage.

In some embodiments, processor state information is flushed to a reserved memory region which is contiguous—e.g., wherein lines of the reserved region 134 span all addresses in a contiguous sub-range of an address space. Alternatively or in addition, such a reserved memory region includes multiple sub-regions which are variously reserved each to store data (and associated address information, for example) which is received from different respective cache of a processor. For example, two such sub-regions are variously reserved to store data from different respective caches of the same one processor core, or (alternatively) to store data from respective caches of different processor cores. In some embodiments, a reserved memory sub-region is allocated to store data (and associated address information, for example) received from a respective cache which is shared by multiple cores of the processor.

Alternatively or in addition, capturing an image of a processor's state includes performing write operations which are ordered, relative to one another, according to the addresses of cache lines from which data is being sequentially flushed and/or according to addresses of reserved region 134 to which such data is being sequentially written. Accordingly, such image capture preserves in reserve region 134 a relative order of at least some data as it was located in a given cache of processor circuitry 110. Alternatively or in addition, at least some lines of reserved region 134 which variously store previously-cached (and subsequently flushed) data are, for example, interleaved with other lines of reserved region 134 which variously store corresponding addresses for such data.

In using reserved region 134 to capture an image of process state for processor circuitry 110—e.g., rather than writing some cached data back to node 102—various embodiments avoid or otherwise mitigate the need to send data across link 140 during operations to accommodate a power disruption. This further avoids associated latencies which would otherwise contribute to an overall delay in a shut-down (or other power state transition) by system 100, thus decreasing the length of time (if any) that system 100 might need to rely on battery backup while data is being flushed from processor circuitry 110. As a result, various embodiments enable the use of a lower capacity (and thus, cheaper) battery backup mechanism with system 100.

Figure 2:
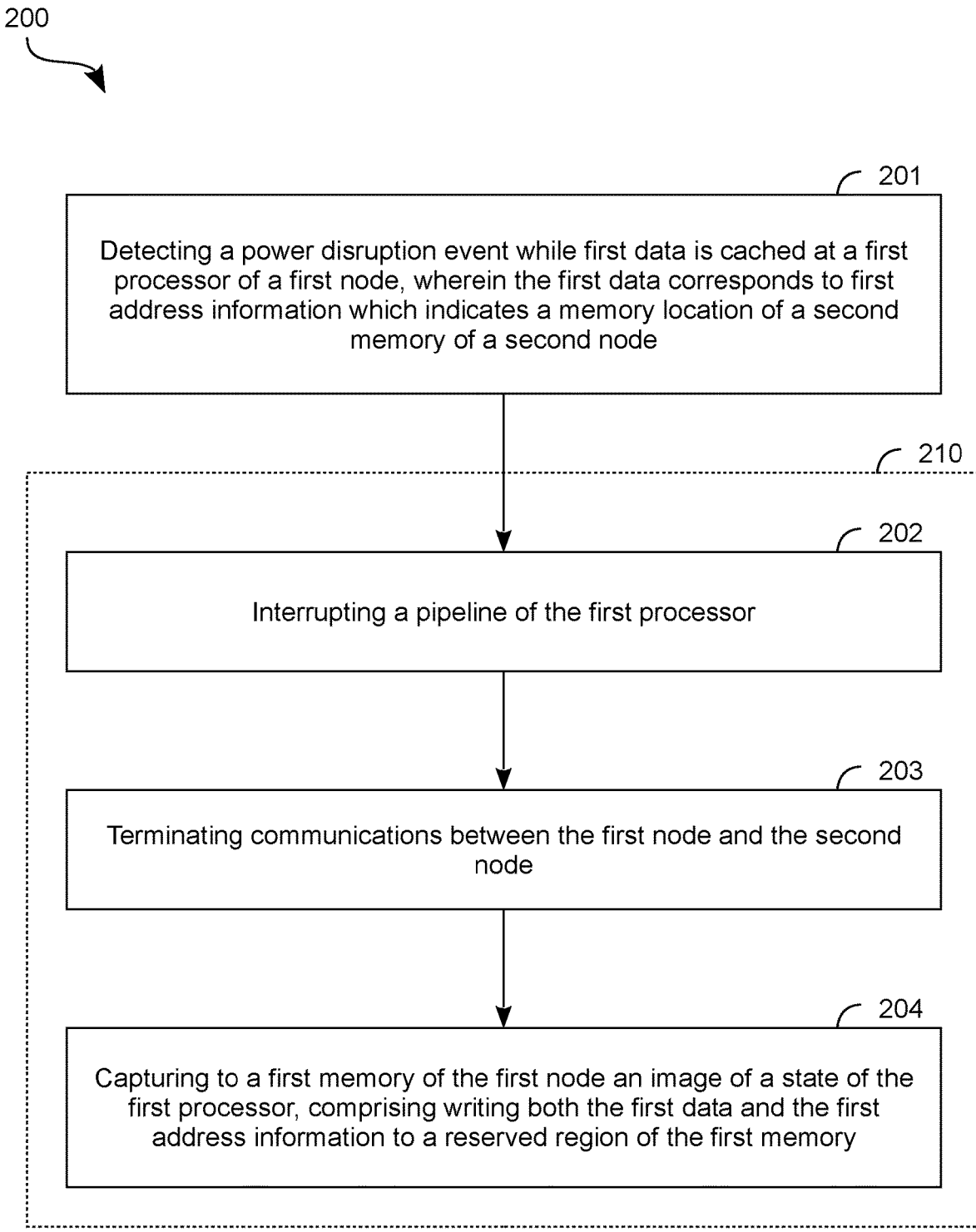
FIG. 2 is a flow diagram illustrating elements of a method to capture processor state information according to an embodiment.

FIG. 2 shows features of a method 200 to capture an image of processor state according to an embodiment. Method 200 is performed at least in part with circuitry which provides functionality of node 102, for example. As shown in FIG. 2, method 200 includes (at 201) detecting a power disruption event, the detecting while first data is cached at a first processor of a first node. A first memory of the first node is accessible to the first processor, wherein the first node is coupled to a second node which comprises a second processor and a second memory. In the illustrative embodiment of system 100, the first node and the second node correspond to nodes 102, 104 (respectively)—e.g., wherein the detecting at 201 is performed with recovery control circuitry 180 and/or with flush logic 118 based on signaling from recovery control circuitry 180.

The first data corresponds to first address information which indicates a memory location of the second memory. In an embodiment, the first address information is cached at the first processor in association with the first data. Such address information includes or otherwise indicates, for example, some or all of a virtual address and/or any of various other types of information which are suitable for use in determining a physical address which is associated with a virtual address—e.g., the determining by operations which, for example, are adapted from address translation techniques of conventional multi-node architectures. By way of illustration and not limitation, the first address information includes one or more of an address offset, a page number, a frame number, a node identifier, and/or the like.

Method 200 further comprises operations 210 which are performed at the first node—responsive to, or otherwise based on, the detecting at 201—to accommodate a transition to a power state that risks a loss of a state of the first processor. In an embodiment, operations 210 include (at 202) interrupting a data processing pipeline which is provided by a core of the first processor and (at 203) terminating communications between the first node and the second node. In an example embodiment, the interrupting at 202 comprises, for each of one or more cores of the first processor, gracefully suspending data processing operations by a respective pipeline of the core and, for example, draining data of the respective pipeline to a cache of that processor core.

Operations 210 further comprise (at 204) capturing an image of a state of the first processor, the capturing comprising flushing a cache of the first processor to a reserved region of the first memory. In an embodiment, such flushing comprises writing both the first data and the first address information to the reserved region. The capturing at 204 comprises, for example, writing the image to a volatile memory of the first node, such as a DDR SDRAM. In one such embodiment, the capturing at 204 further comprises, after writing the image to the volatile memory, writing the image to a non-volatile memory—e.g., wherein the non-volatile memory comprises a 3D XPoint memory array or other such three dimensional array of phase change memory elements. In some embodiments, flushing the cache at 204 preserves a relative order of data cached by respective lines of the cache. Alternatively or in addition, operations 210 further comprise (for example) disabling a hash engine which is coupled between a core of the first processor and the first memory, wherein the image is captured at 204 while the hash engine is disabled.

The image is captured at 204, for example, according to an allocation of multiple caches of the first processor each to a different respective sub-region of the reserved region—e.g., wherein each such cache is flushed to its respective allocated sub-region. In an illustrative embodiment, the first processor comprises a first core, and the multiple caches comprise a first cache and a second cache (an L1 cache and an L2 cache, for example) each of the first core. In another embodiment, first processor comprises a first core and a second core, and the multiple caches comprise a first cache of the first core, and a second cache of the second core. Alternatively or in addition, the multiple caches include a cache (e.g., an LLC) which is shared by multiple cores of the first processor. In some embodiments, terminating the communications at 203 comprises receiving an acknowledgement that a link between the first node and the second node is blocked. In one such embodiment, operations 210 further comprise draining data from the pipeline of the first processor (after the interrupting at 210, for example), wherein the image is captured at 204 after draining the pipeline and after receiving the acknowledgement. In some embodiments, any cached data which is flushed from the first processor to the second node is flushed independent of the detecting at 201.

In some embodiments, the detecting at 201 also takes place while some second data is cached at the first processor, wherein the second data corresponds to second address information which represents a memory location of the first memory. For example, referring again to system 100, flush logic 118 (in one scenario) detects a power disruption event at a time when processor circuitry 110 caches—e.g., with one or more of caches 114a, . . . , 114n and 116—both a version of data which was retrieved from line 176, and a version of some other data which was retrieved from memory 130. In such an embodiment, flushing the cache at 204 further comprises writing both the second data and the second address information to the reserved region.

Alternatively or in addition, the detecting at 201 also takes place (for example) while some third data is cached at the second processor, wherein the third data corresponds to third address information which indicates a third memory location of the first memory. For example, referring again to system 100, processor circuitry 150, in some embodiments, provides functionality—similar to that of flush logic 118—to detect the power disruption event at a time when a cache (not shown) of processor circuitry 150 caches a version of data which node 104 retrieved memory 130. In one such embodiment, method 200 comprises additional operations (not shown) which are performed at the second node—responsive to, or otherwise based on, the detecting at 201—to accommodate a possible loss of state of the second processor. Such additional operations include, for example, interrupting a pipeline of the second processor (similar to the interrupting at 202) and capturing an image of a state of the second processor. Similar to the capturing at 203, such image capturing for the second processor comprises flushing one or more caches of the second processor to a second reserved region of the second memory, wherein said flushing comprises writing both the third data and the third address information to the second reserved region. This flushing of processor state at the second node avoids or otherwise mitigates the need to communicate data back to the first node prior to a power state transition of the second processor. In some embodiments, any cached data which is flushed from the second node to the first node is flushed independent of the detecting at 201.

In some embodiments, operations 210 further comprise generating a signal, after the image is captured at 204, to enable, at least in part, a shutdown of the first processor and, for example, one or more other nodes such as the second node. For example, flush logic 118 is coupled, in some embodiments, to signal to recovery control circuitry 180 when an image capture for processor circuitry 110 has been completed. Alternatively or in addition, method 200 comprises additional operations (not shown) which restore a state of the first processor based on the image capture performed at 204. Such additional operations comprise (for example) detecting a boot-up of the first processor and, based on the detecting of the boot-up, accessing the previously-captured processor state information at the reserved region. Based on the accessing, the first data and the first address information—e.g., in addition to other data and corresponding address information of the captured image—are written to a cache of the first processor. Such restoring of the processor state is performed, for example, by a system boot sequence of a BIOS for the first node.

Figure 3:
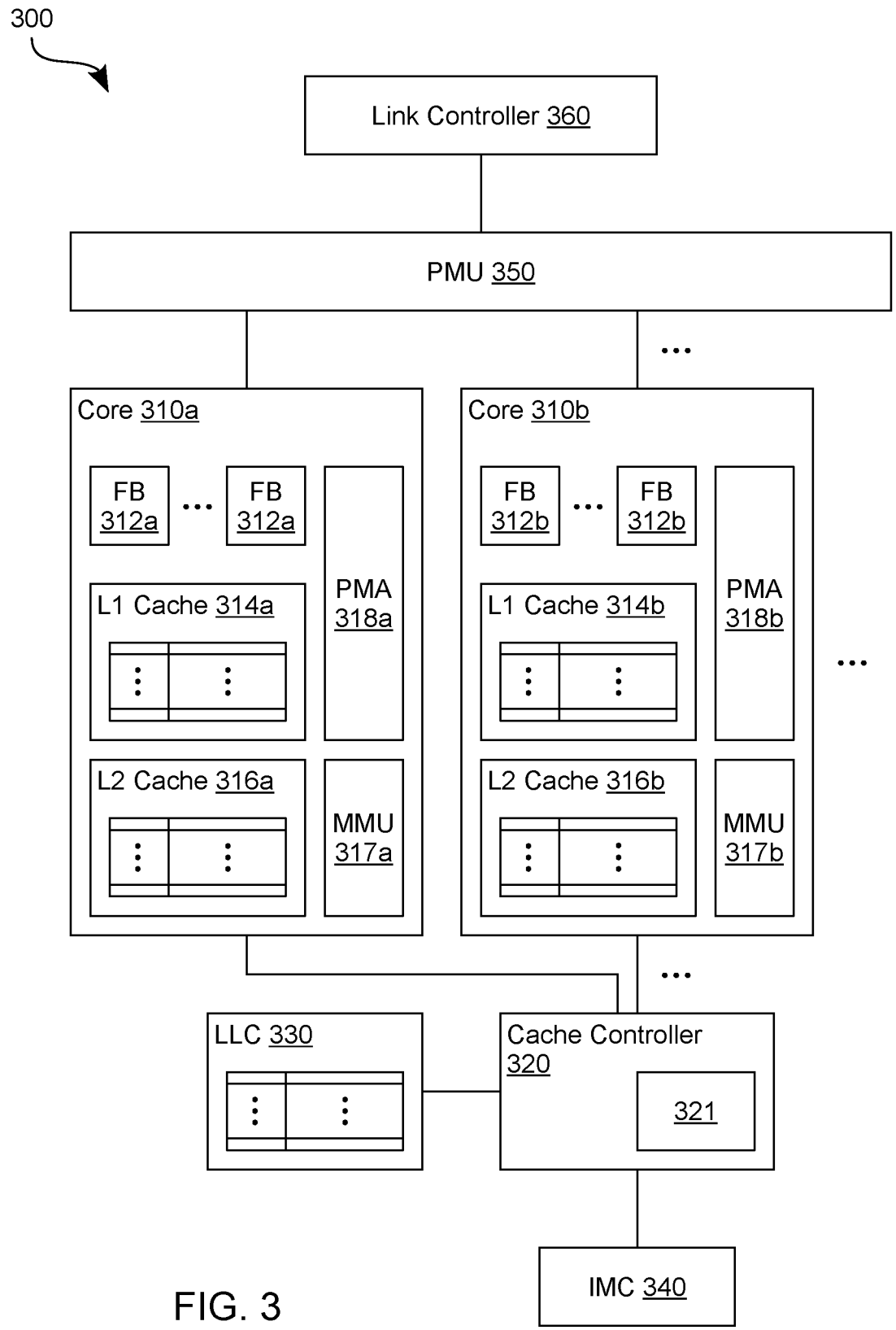
FIG. 3 is a functional block diagram illustrating elements of a processor which supports disaster recovery according to an embodiment.

FIG. 3 shows features of a processor 300, according to an embodiment, for facilitating a capture of processor state information to a reserved system memory region. Processor 300 is one example of an embodiment wherein processor circuitry is operable in a node which is coupled to another node—e.g., to provide distributed computing functionality wherein the processor circuitry accesses data from a memory of the other node. Processor state information captured to a memory of the node comprises a version of such data. Processor 300 provides functionality of processor circuitry 110, for example, and/or is operable to perform some or all of method 200.

As shown in FIG. 3, processor 300 includes multiple processor cores (such as the illustrative cores 310a, 310b shown) and an integrated memory controller IMC 340 coupled to thereto—e.g., wherein a cache controller 320 of processor 300 is coupled between IMC 340 and cores 310a, 310b. In the illustrative embodiment shown, core 310a comprises a L1 cache 314a and a second layer cache 316a—e.g., wherein core 310b similarly comprises a L1 cache 314b and a second layer cache 316b. A last layer cache LLC 330 is coupled to (and shared by) cores 310a, 310b—e.g., wherein cache controller 320 is to facilitate cache flushing for some or all of L1 caches 314a, 314b, L2 caches 316a, 316b and LLC 330. In one such embodiment, core 310a, 310b correspond functionally to cores 112a, 112n—e.g., wherein one or both of L1 cache 314a and L2 cache 316a correspond functionally to cache 114a, where one or both of L1 cache 314b and L2 cache 316b correspond functionally to cache 114n, and/or where last level cache (LLC) 330 correspond to cache 116.

Cores 310a comprise circuitry (represented by functional blocks 312a) which each perform a respective one of branch prediction, instruction caching, instruction fetching, instruction decoding, scheduling, instruction execution, instruction queueing/de-queueing, signal input and/or output (e.g., Tx/Rx), or other functionality to implement a processing pipeline. Some or all such functionality is similarly provided by functional blocks 312b of core 310b, in some embodiments.

Furthermore, cores 310a, 310b, cache controller 320, IMC 340 and/or other circuitry of processor 300 supports address translation functionality which, for example, is available to create, search, or otherwise determine associations of various virtual addresses for data each with a corresponding physical address of a memory location. In the example embodiment shown, such functionality is provided at least in part with respective memory management units MMU 317a and MMU 317b of cores 310a, 310b. However, processor 300 includes any of a various additional or alternative data addressing mechanisms, in other embodiments—e.g., including mechanisms which are adapted from conventional data addressing techniques.

To facilitate image capture operations, processor 300 further comprises power management unit (PMU) 350 and respective power management agents PMA 318a and PMA 318b of cores 310a, 310b—e.g., some or all of which provide functionality of flush logic 118. PMU 350 is one example of circuit logic which is distinct from, and variously coupled to, multiple cores of processor 300, where PMU 350 manages operation of the cores to facilitate the capture of processor state information which represents at least some state of processor 300. In some embodiments, such management comprises PMU 350 communicating with PMAs of various cores—e.g., including the respective PMAs 318a, 318b of cores 310a, 310b. For example, PMU 350 issues a command PF_Flush (Power Fail Flush) to some or all cores of processor 300, which each interpret the PF_Flush command as a command to begin a pipeline drain. Such signaling by PMU 350 is adapted, for example, from conventional processor management techniques to gracefully terminate core processing in preparation for disaster recovery. In some embodiments, PMU 350 further communicates with a link controller 360 of processor 300—e.g., in parallel with pipeline drain operations—to terminate communication between processor 300 and a node (not shown) other than one which comprises processor 300.

In an example embodiment, PMA 318a (responsive a flush command from PMU 350) interrupts, and subsequently drains, a pipeline which is implemented with functional blocks 312a of core 310a—e.g., wherein data of the pipeline is flushed to one of L1 cache 314a or L2 cache 316a. Subsequently, PMA 318a provides to PMU 350 a signal acknowledging that pipeline flushing at core 310a has completed. Alternatively or in addition, PMA 318b (responsive to PMU 350) interrupts, and subsequently drains, a pipeline which is implemented with functional blocks 312b of core 310b—e.g., wherein data of the pipeline is flushed to one of L1 cache 314b or L2 cache 316b. Subsequently, PMA 318b provides to PMU 350 a signal acknowledging that pipeline flushing at core 310b has completed.

In an example embodiment, PMA 318a aggregates acknowledgement signals from different respective ones of functional blocks 312a, and exposes a corresponding single acknowledgement signal PF_Ack (Power Fail Acknowledge) to PMU 350. Alternatively or in addition, PMA 318b (in some embodiments) aggregates acknowledgement signals each from a respective one of functional blocks 312b, and exposes a corresponding single acknowledgement signal PF_Ack to PMU 350. Although PMA 318a is represented as a single agent of core 310a (and PMA 318b as a single agent of core 310b), in some embodiments a core comprises multiple power management agents—e.g., where the functional blocks 312a shown are each controlled by a different respective power management agent of core 310a.

After receiving pipeline drain acknowledgement signals from the cores (e.g., from PMA 318a and PMA 318b), PMU 350 signals one or more other agents—e.g., including recovery control circuitry 180 and/or cache controller 320—that draining of the cores has completed. In an embodiment, such signaling enables a next PF (Power Fail) phase wherein caches of processor 300 are variously flushed to capture an image of processor state. For example, PMU 350 signals to cache controller 320 that data (and corresponding address information) is to be variously flushed from one or more caches, via IMC 340, to a memory which is coupled to processor 300. Such one or more caches include, for example, some or all of L1 caches 314a, 314b, L2 caches 316a, 316b, and LLC 330.

Such signaling from PMU 350 causes cache controller 320 to perform one or more cache flush operations (to write data and corresponding address information to reserve memory region 134, for example). In some embodiments, cache controller 320 includes or otherwise has access to circuitry (such as the illustrative hash engine 321 shown) which is operable to perform a hash operation for data being written to and/or read from the system memory. In one such embodiment, hash engine 321 is disabled—e.g., by PMU 350—in response to the detection of a power disruption, and remains disabled during the flushing of some or all caches of processor 300. Disabling such hash functionality decreases the time needed to complete image capture. In some embodiments, the image capture is alternatively or additionally expedited by cache controller 320 bypassing some or all available cache coherency checks that are otherwise available for data being flushed from caches of processor 300.

Figure 4A:
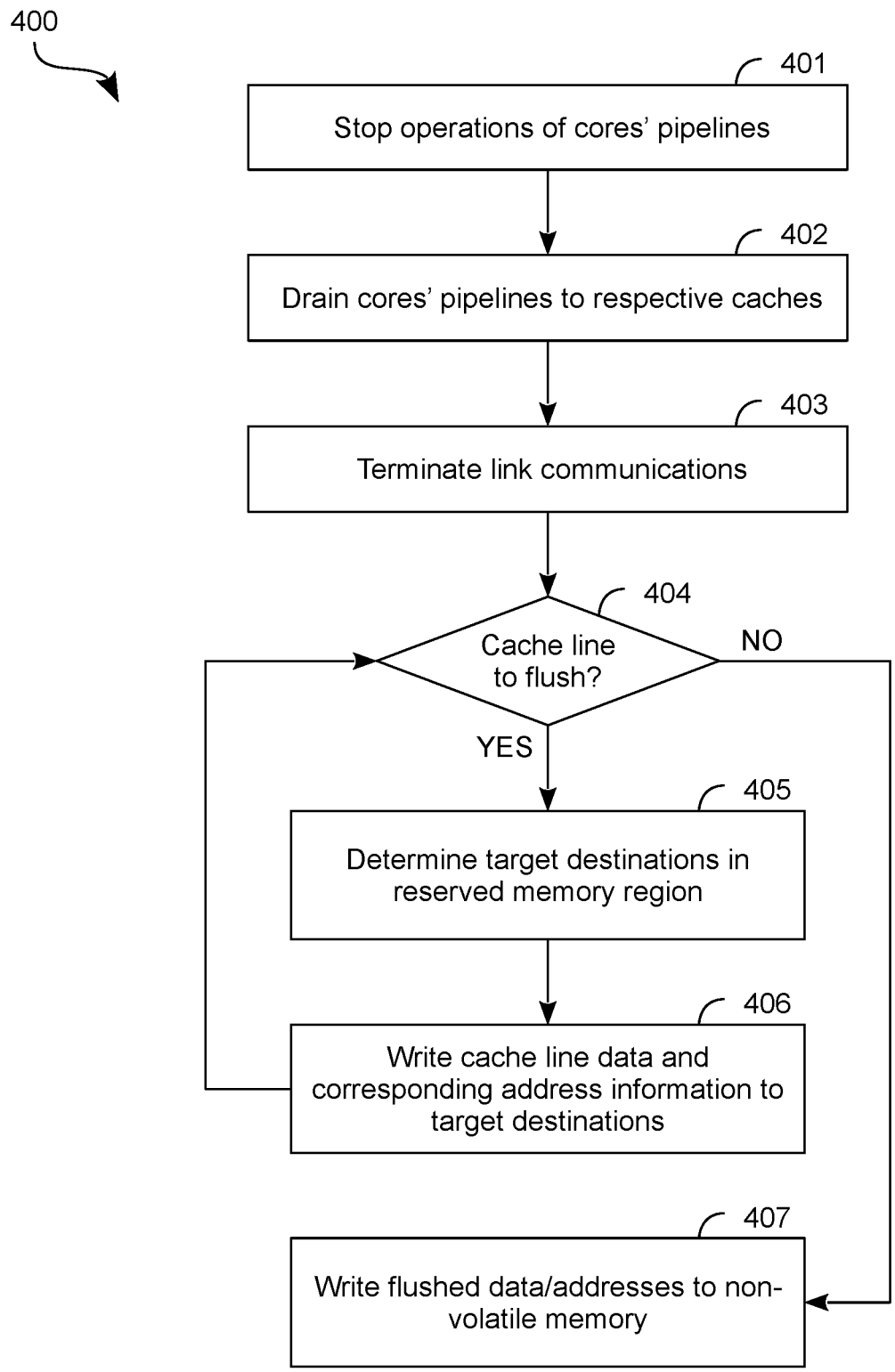
FIG. 4A is a flow diagram illustrating elements of a method to flush processor state information to a reserved memory region according to an embodiment.

FIG. 4A shows features of a method 400 at a node (such as node 102, for example), the method 400 to capture in image of processor state according to an embodiment. Method 400 includes operations of method 200, for example, and/or is performed with processor 300 or processor circuitry 110. As shown in FIG. 4A, method 400 includes (at 401) stopping data processing operations by respective pipelines of a processor's cores. Such stopping includes, for example, the interrupting at 202 of method 200—e.g., wherein cores 112a, . . . , 112n (or cores 310a, 310b) stop data processing operations.

Method 400 further comprises (at 402), for each of the pipeline cores, draining the pipeline of that core to a local cache (or caches) of the core. The pipeline draining at 402 includes, for example, writing data from various pipeline registers each to a corresponding cache. In an embodiment, method 400 further comprises (at 403) terminating communications via a link between the node and another node coupled thereto.

After the pipeline draining at 402 and a termination of inter-node communications at 403, method 400 proceeds to a phase which variously flushes caches of the node to a reserved region of a memory which is coupled to the processor. For example, method 400 further comprises (at 404) determining whether a cache line remains to be flushed from the processor to a reserved region of the memory. The determining at 404 includes, for example, identifying a cache for which flushing is already underway, or identifying a next cache from which flushing is to commence. Such a cache is selected, for example, based on to a predetermined order of caches. For example, caches are prioritized relative to one another, in some embodiments, according to their respective cache levels (e.g., where a L1 cache is to be flushed before a L2 cache, and a L2 cache is to be flushed before a L3 cache). Alternatively or in addition, caches are prioritized, for example, according to an order of the cores— e.g., wherein all caches of one core are to be flushed before any cache of some other core. The determining at 404 further includes, for example, determining that one or more cache lines of a selected cache remain to be flushed—e.g., wherein a next cache line to be flushed is selected according to a predetermined sequence (e.g., a sequence of addresses) of cache lines.

Where it is determined at 404 that there remains a next cache line of the processor to be flushed, method 400 (at 405) determines target destinations, in the reserved memory region, each for a respective one of flushed cache data, or address information corresponding to said data. For example, the determining at 405 includes identifying a next two addresses in a sequence of increasing (or alternatively, decreasing) addresses of the reserved region. In some embodiments, the determining at 405 additionally or alternatively includes identifying a sub-region (if any) of the reserved memory region, where the sub-region is dedicated to the cache which includes the cache line most recently identified at 404. Based on the determining at 405, method 400 performs (at 406) a writing of the cache line data, and the address information corresponding to said data, each to a respective one of the target destinations most recently determined at 405.

After the writing at 406, another determination is made (at 405) as to whether there remains any next cache line to flush. Accordingly, for a given cache line which is flushed by method 400, a corresponding two lines of the reserved memory region are written to, in some embodiments—e.g., where one such memory line stores data of the cache line, and another such memory line stores address information corresponding to said data. For example, a total number of those lines in the reserved memory region which are written to by method 400 is, in some embodiments, at least twice a total number of cache lines which are flushed. In an embodiment, address information for at least some data flushed by method 400 indicates a physical address of a memory location at a different node (e.g., node 104, for example).

Although some embodiments are not limited in this regard, the reserved memory region is that of a volatile memory such as a DDR SDRAM. In one such embodiment, where it is determined at 404 that no more cache lines of the processor remain to be flushed, method 400 (at 407) further moves, copies or otherwise writes the previously flushed data and address information to a non-volatile memory— e.g., wherein the non-volatile memory includes a three dimensional array of phase change memory cells. The captured image is then available for use in subsequent processing—e.g., after a system shut-down—to recover the state of the processor.

Figure 4B:
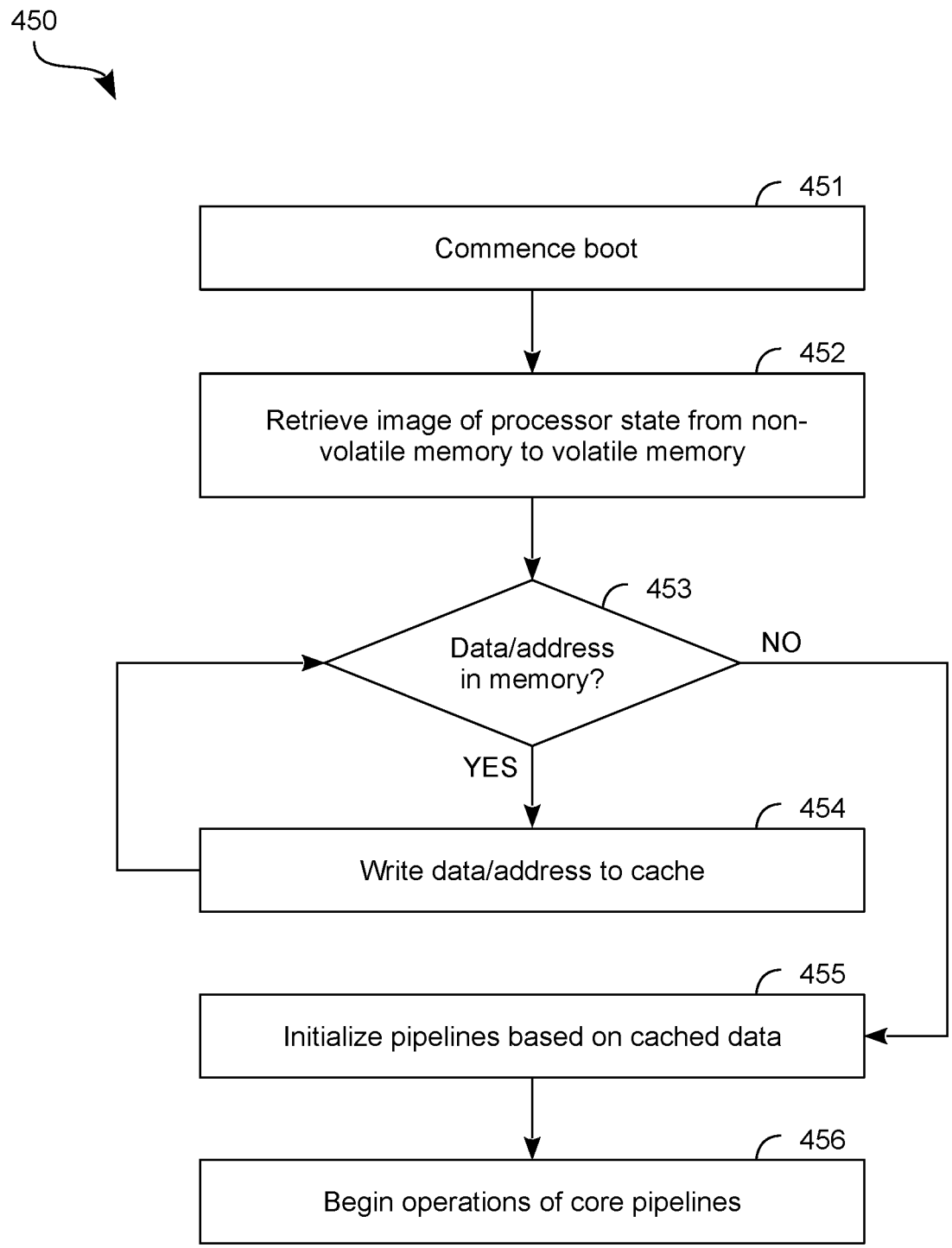
FIG. 4B is a flow diagram illustrating elements of a method to recover an image of a processor state from a reserved memory region according to an embodiment.

For example, FIG. 4B shows features of a method 450 at a node (such as node 102, for example), where the method 450, according to an embodiment, is to recover processor state based on processor state information such as that which is captured by method 400. Method 450 is performed, for example, with processor 300 or processor circuitry 110.

As shown in FIG. 4B, method 450 includes (at 451) commencing a boot-up of a processor for which processor state information was previously captured, for example, by method 400. In response to, or as part of, the boot-up commenced at 451, method 450 retrieves the image of processor state (at 452) from a non-volatile memory of the node to a volatile memory of the node. For example, the retrieving at 452 includes writing processor state information to a reserved region of the volatile memory.

After the retrieving at 452, method 450 proceeds to a phase which moves, copies or otherwise writes processor state information from the volatile memory to various caches of the processor. For example, method 450 further comprises (at 453) determining whether the volatile memory still includes some next data—and address information corresponding thereto—which remains to be moved to a corresponding processor cache. For example, the determining at 453 includes identifying a next two addresses in a sequence of increasing (or alternatively, decreasing) addresses of the reserved region. In some embodiments, the determining at 453 additionally or alternatively includes identifying a sub-region (if any) of the reserved memory region, where the sub-region is dedicated to storing processor state information associated with a cache for which state restoration is underway or is to commence.

Based on the determining at 453, method 400 performs (at 454) a writing of the data, and the address information corresponding thereto, to a corresponding one or more cache lines of the processor. In some embodiments, the writing at 454 includes identifying a cache for which state restoration is already underway, or identifying a next cache from which state restoration is to commence. Such a cache is selected, for example, based on to a predetermined correspondence of memory lines, which are identified at 453, to one or more lines of said cache. In some embodiments, address information for at least some data restored by method 450 indicates a physical address of a memory location at a different node (e.g., node 104, for example).

After the writing at 454, another determination is made (at 453) as to whether any next data—and address information corresponding thereto—remains to be written from the volatile memory to a corresponding processor cache. Where it is determined at 453 that no more data, and corresponding address information, needs to be restored to the processor caches, method 400 (at 455) initializes the respective pipelines of the cores based data in the caches. After such initialization at 455, method 450 begins operations of the cores' respective pipelines (at 456). Such pipeline initialization and operation is adapted, in some embodiments, from conventional techniques for resuming data processing of a pipeline.

Figure 5:
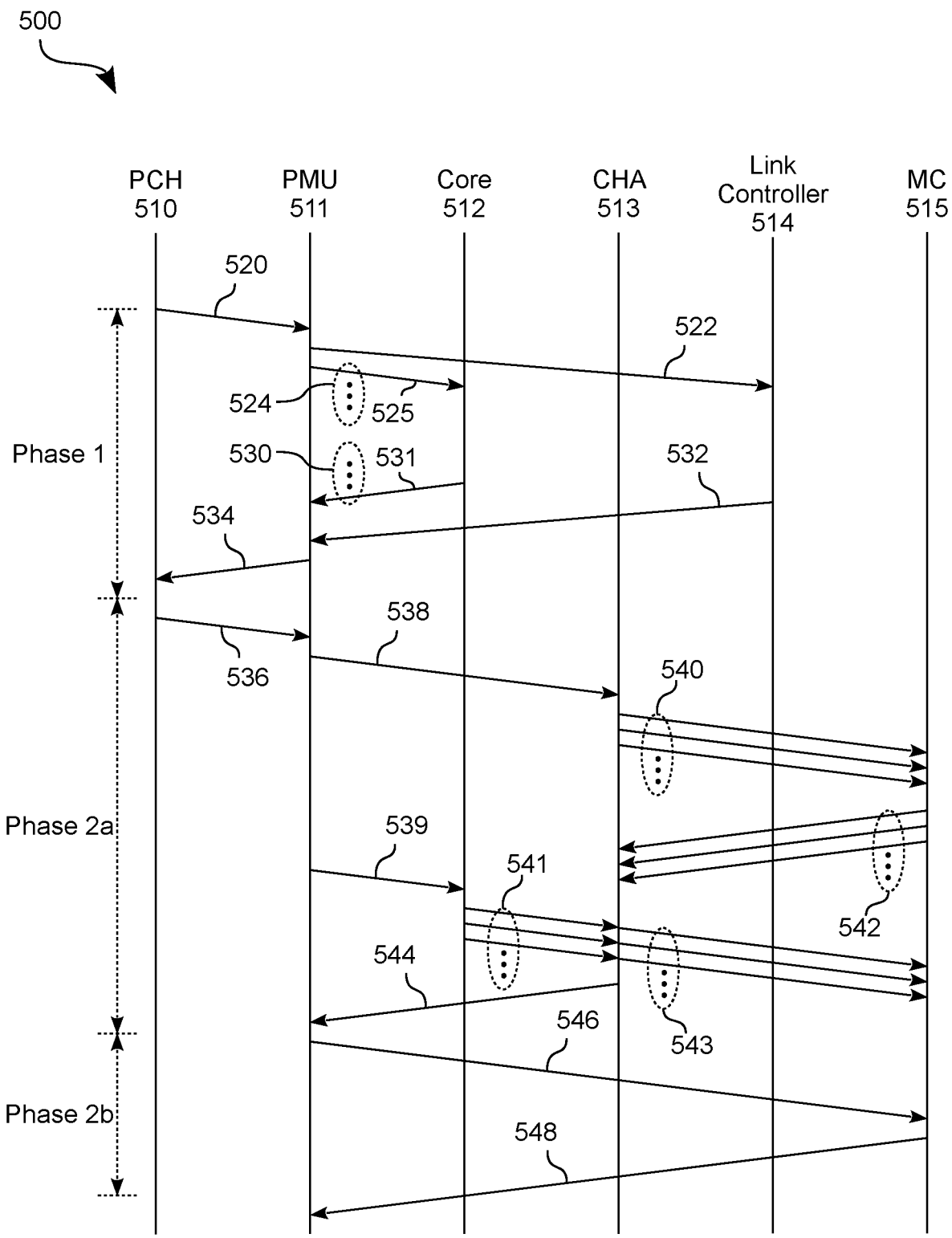
FIG. 5 is a swim lane diagram illustrating elements of communications by a processor to support disaster recovery according to an embodiment.

FIG. 5 shows communications 500 during operations to prepare for a disruption of power delivery at a processor of a multi-node system. Communications 500 are performed, for example, with circuitry of node 110 or with processor 300—e.g., wherein communications 500 facilitate one of methods 200, 400, 450. As shown in FIG. 5, communications 500 are conducted with a platform controller hub PCH 510 and a node coupled thereto. A processor of the node comprises a power management unit PMU 511, one or more processor cores (including the illustrative core 512 shown), a cache and homing agent CHA 513, a link controller 514 and a memory controller MC 515. For example, PMU 511, core 512, CHA 513, link controller 514 and MC 515 correspond functionally to PMU 350, core 310a, cache controller 320, link controller 360 and IMC 340 (respectively).

In the example embodiment shown, communications 500 comprise a signal 520, generated by PCH 510, which indicates to PMU 511 the detection of an actual (or expected future) power disruption event—e.g., where an image of processor state is to be captured in preparation for the power disruption event. Signal 520 initiates a phase (labeled "Phase 1" in FIG. 5) which is to arrive at least some settled state of the processor. For example, in Phase 1, PMU 511 generates a signal 522 which indicates to link controller 514 that an inter-node link (such as one provided with interconnect 140, for example) is to be blocked. PMU 511 further generates signals 524 which each indicate to a respective processor core that a pipeline of that core is to be interrupted and drained. For example, signals 524 includes a signal 525 to initiate the draining of a pipeline at core 512.

During communication of signal 520 and/or signals 524, one or more cores of the processor each cache at least some version of respective data which the node previously retrieved from another node. For example, a cache of core 512 has a version of such data from another node when signal 525 is received. Based on signals 524, the processor cores each perform respective pipeline draining, subsequently generating respective signals 530 which each indicate to PMU 511 that pipeline draining has been completed. For example, signals 530 include a signal 531 with which PMU 511 is notified that pipeline draining by core 512 is complete.

At some point during or after the communication of signals 530, link controller 514 communicates to PMU 511 a signal 532 which indicates that inter-node communication has been terminated, and that a communication link with one or more other nodes is currently blocked. In some embodiments, the link is blocked before any cache of the processor flushes data back to another node. In response to signals 530 and signal 532, PMU 511 generates a signal 534 which indicates to PCH 510 that the node is now ready for a next phase (labeled "Phase 2a") to capture an image of the processor state which was determined by Phase 1. During Phase 2a, processor caches are to be variously flushed to a reserved region of a system memory.

For example, in Phase 2a, PCH 510 generates a signal 536 which indicates to PMU 511 that a flushing of processor caches can commence. Responsive to signal 536, PMU 511 communicates to CHA 513 a signal 538 which initiates a cache flush sequence (such as one according to method 400) and, in some embodiments, disables a hash engine—e.g., hash engine 321—in preparation for such a sequence. Additionally or alternatively, signal 538 disables a cache coherency functionality in preparation for the cache flush sequence. In some embodiments, cache flushing includes CHA 513 generating signals 540 to variously communicate to MC 515 respective data, and corresponding address information, which has been flushed from a last layer cache of the cache pipeline and which is to be variously written to one or more reserve memory regions. Responsive to signals 540, MC 515 performs the requested system memory writes, subsequently generating signals 542 to acknowledge completion of such writing.

In one such embodiment, PMU 511 further provides one or more signals (responsive to signal 536) to variously flush one or more caches each of a respective processor core—e.g., wherein core 512 receives from PMU 511 a signal 539 indicating that caches of core 512 are to be flushed. Responsive to signal 539, core 512 generates signals 541 each to variously communicate to CHA 513 respective data, and corresponding address information, which has been flushed from caches of core 512. Subsequently, CHA 513 generates signal 543 for MC 515 to write, to a reserved memory region, the data and corresponding address information which is communicated with signals 541.

Based on signals 541 and/or signals 542, CHA 513 communicates to PMU 511 a signal 544 which indicates that the flushing of caches to the reserve memory region has been completed. In some embodiments, signal 544 indicates the beginning of a next phase (labeled Phase 2B) to write the captured processor state information from the reserved memory region—which, for example, is a volatile memory region—to a non-volatile memory. In Phase 2b, PMU 511 generates a signal 546 which indicates to MC 515 that the captured processor state information can be copied, moved or otherwise written to non-volatile memory. Responsive to signal 546, MC 515 performs the write to non-volatile memory, subsequently communicating to PMU 511 a signal 548 which indicates completion of the non-volatile memory write.

FIG. 6 shows state information 600 which is accessed to facilitate disaster recovery according to an embodiment. State information 600 is stored at, or otherwise accessible to, circuitry of node 110 and/or processor 300—e.g., wherein one of methods 200, 400, 450 is to determine (or is performed based on) some or all of state information 600.

As shown in FIG. 6, state information 600 includes a reserved memory region 610 such as reserved region 134 of array 132. Cache flushing according to one such embodiment comprises circuitry—e.g., that of MC 120, or one or both of cache controller 320 and IMC 340—writing some data, and address information corresponding to that data, each to a respective line of a pair of lines (or "line pair") in reserved memory region 610. For example, memory region 610 includes lines 612 which are reserved to variously store data which has been flushed from processor caches. Other lines 614 of memory region 610 are reserved to variously store corresponding address information for said data. Such address information is to indicate a system memory location from which data in one of lines 612 was originally retrieved, and is to be distinguished, for example, from the respective addresses of lines 612. In the example embodiment shown, different sub-regions of reserve memory region 610 are further allocated each to a different respective cache. For example, these sub-regions include a LLC Reserve sub-region which is to store data and address information which has been flushed from a last layer cache (e.g., cache 116 or LLC 330). The sub-regions also include a MLC Reserve sub-region which is to store data and address information which has been flushed from a mid-layer cache (e.g., one of L2 caches 316a, 316b).

During a cache flush operation, a pointer is successively moved along through a sequence of line pairs in reserve memory region 610, where each such line pair includes a respective one of lines 614 and a respective one of lines 612. In one such embodiment, capturing processor state information to reserve region 610 comprises successively moving a pointer LLCTrace_ptr down (or alternatively, up) through the sequence of line pairs, to perform corresponding address and data writes to the LLC Reserve sub-region. Such image capturing further comprises successively moving a pointer MLCTrace_ptr down (or alternatively, up) to perform corresponding address and data writes to the MLC Reserve sub-region. In some embodiments, flag bits or other such metadata are added (e.g., each to the address information in a respective one of lines 614) to indicate when a given line pair currently includes valid data and address information. Such flag bits are used, for example, to indicate to a memory controller (such as IMC 340) when the restoring of a most recently captured image of processor state has been completed.

As shown in FIG. 6, state information 600 also includes a translation table 620 which is created, updated or otherwise used—e.g., by MC 120, cache controller 320, MMU 317a, MMU 317b or the like—to support the identifying of a physical address based on a corresponding virtual address. In some embodiments, such use of translation table 620 includes operations adapted, for example, from conventional address translation techniques.

In the example embodiment shown, translation table 620 comprises a virtual address column 622 and a physical address column 624 to provide a mapping of virtual addresses and respective physical addresses. As illustrated by the example format 630, a given entry in physical address column 624 comprises a node identifier 632 and a page address 634. Accordingly, translation table 620 supports address translation, at a first node of a multi-node system, to indicate a physical address of a memory location in another node of the multi-node system. Address information which is captured according to some embodiments includes, for example, virtual address information which is indicated by column 622.

Figure 7:
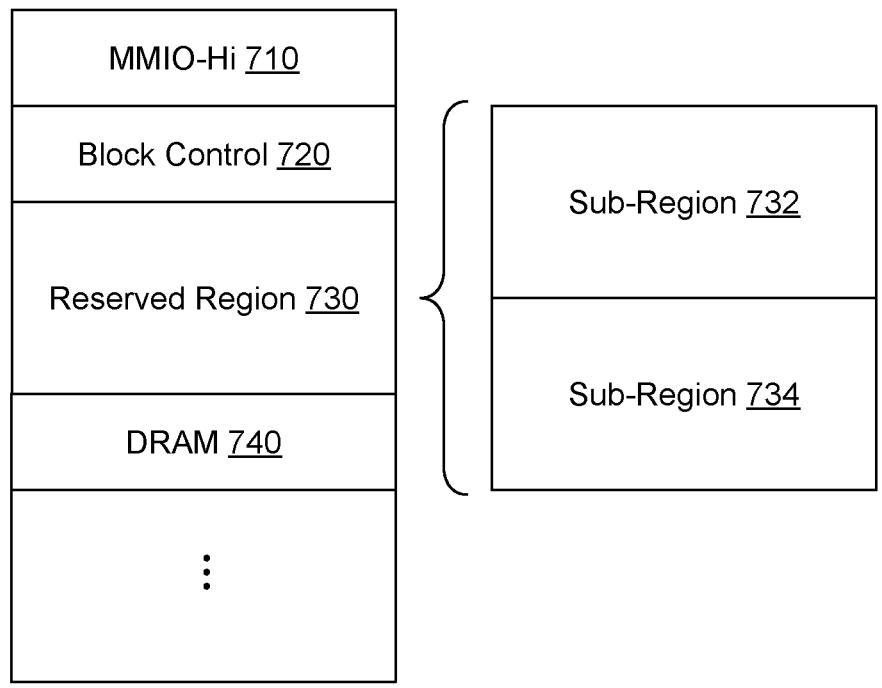
FIG. 7 illustrates address map information which designates a memory region which is reserved to store processor state information in accordance with an example embodiment

FIG. 7 illustrates an example of a system physical address (SPA) map 700 for a node (such as node 102) which comprises a reserved memory region. The node is able to operate in a one-level memory (1LM) mode or a two-level memory (2LM) mode, in some embodiments. In addition, the SPA map 700 can be for one or more dual in-line memory modules (DIMMs) of the node. As a non-limiting example, the DIMMs can support a three dimensional (3D) XPoint non-volatile memory technology.

In addition to the reserved memory region 730, the SPA map 700 includes, for example, a Memory Mapped Input Output High (MMIOH) region 710, a block control region 720, and a first DRAM memory region 740 (e.g., a DDR4 region) associated with memory resources other than those which are reserved for image capture in support of disaster recovery. SAP 700 defines any of various other memory regions, in different embodiments.

In one such embodiment, reserved memory region 730 includes two sub-regions 732, 734 which are associated (respectively) with a reserved range of volatile memory and a reserved range of non-volatile memory. For example, boot-up of the node takes place during a configuration, determined by a BIOS of the node, wherein sub-region 732 is associated with a reserved range of volatile memory, and sub-region 734 is associated with a reserved range of non-volatile memory. In such a configuration, sub-region 732 is designated to capture processor state information in support of disaster recovery. After an image or processor state is captured by the volatile memory resources represented by sub-region 732, the image is moved, copied or otherwise written to the non-volatile memory resources represented by sub-region 734. The node is then subjected to a shut-down (or other such power state transition) and subsequently rebooted. During reboot, the BIOS (for example) detects that a previously-captured image of processor state is available to be restored from the non-volatile memory resources represented by sub-region 734. Such image restoration is performed, for example, according to method 450.

The figures described herein detail exemplary architectures and systems to implement embodiments of the above. In some embodiments, one or more hardware components and/or instructions described herein are emulated as detailed below, or implemented as software modules.

Figure 8:
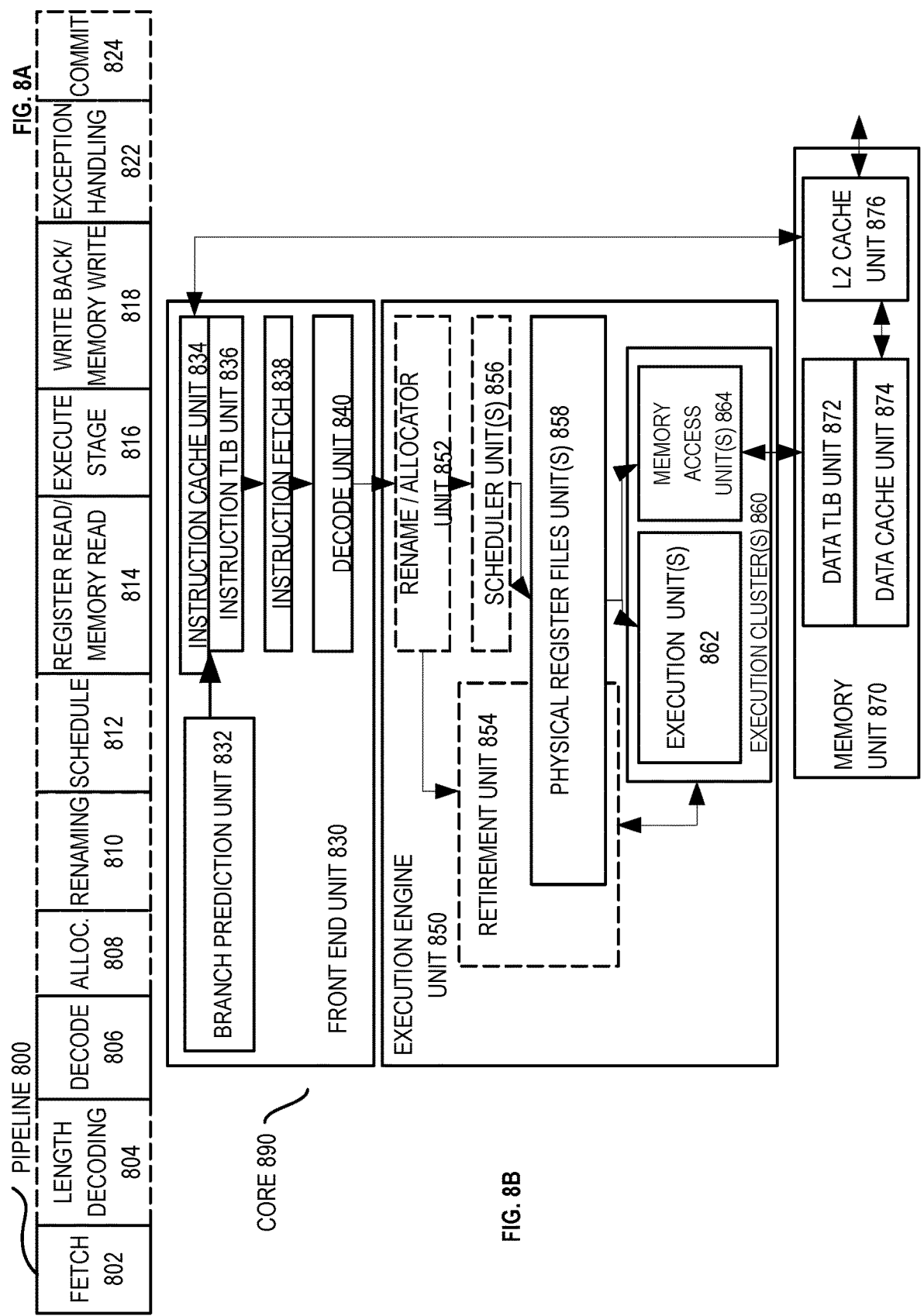
FIG. 8A is a block diagram illustrating both an exemplary in-order pipeline and an exemplary register renaming, out-of-order issue/execution pipeline according to embodiments of the invention.
FIG. 8B is a block diagram illustrating both an exemplary embodiment of an in-order architecture core and an exemplary register renaming, out-of-order issue/execution architecture core to be included in a processor according to embodiments of the invention.

FIG. 8A is a block diagram illustrating both an exemplary in-order pipeline and an exemplary register renaming, outof-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 9:
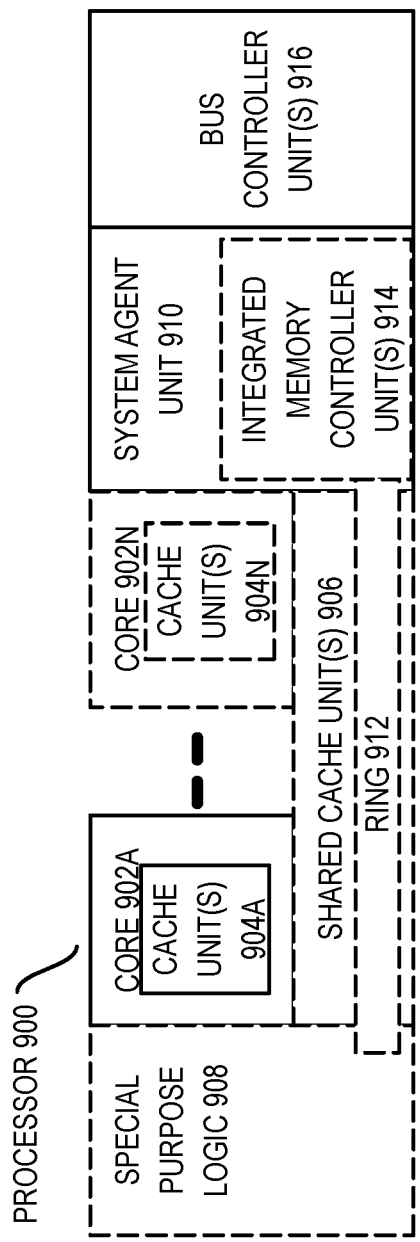
FIG. 9 is a block diagram of a processor that may have more than one core, may have an integrated memory controller, and may have integrated graphics according to embodiments of the invention.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and respective cache units 904A-N of cores 902A-N.

In some embodiments, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Figure 10:
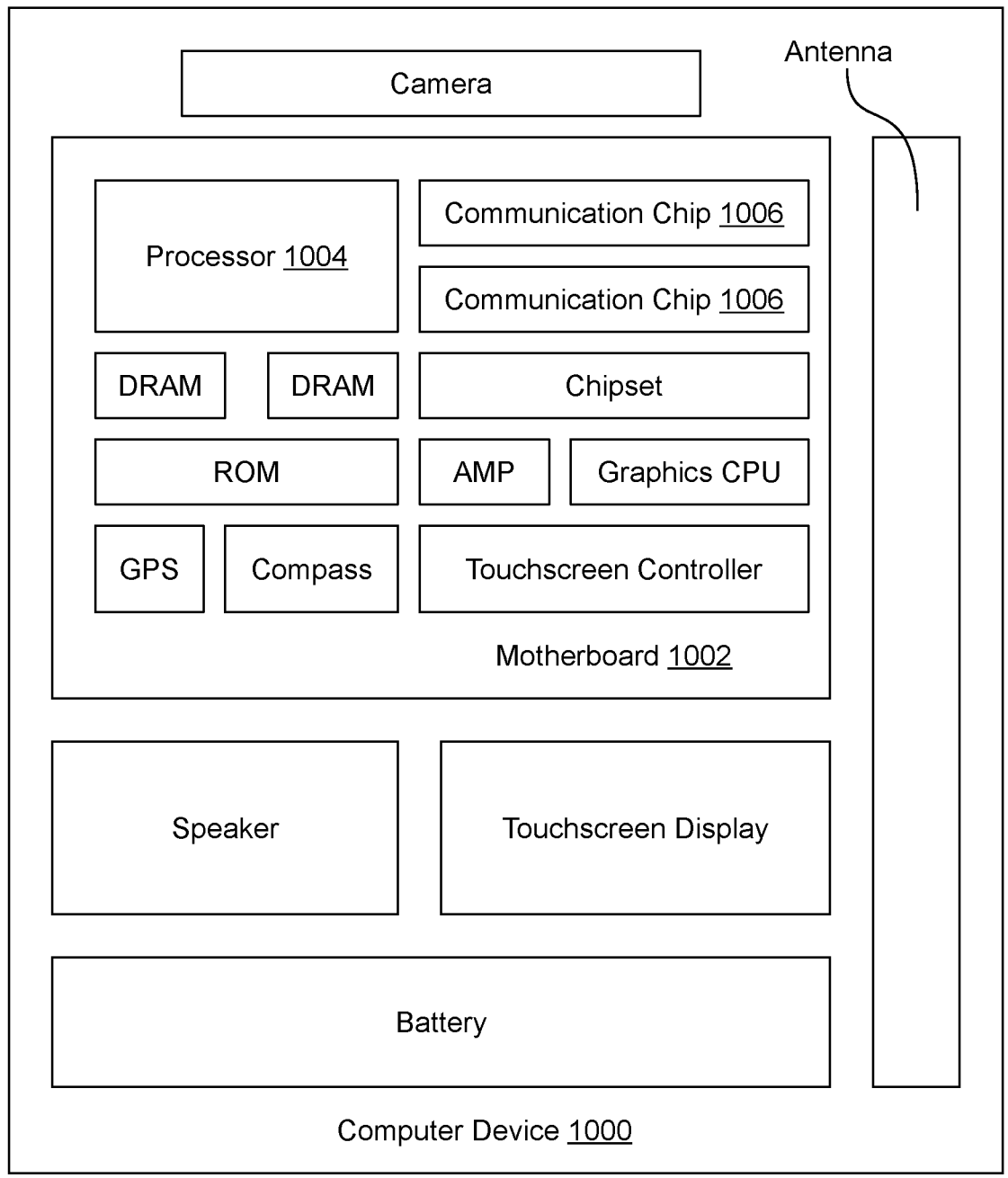
FIG. 10 is a functional block diagram illustrating a computing device in accordance with one embodiment.

FIG. 10 illustrates a computing device 1000 in accordance with one embodiment. The computing device 1000 houses a board 1002. The board 1002 may include a number of components, including but not limited to a processor 1004 and at least one communication chip 1006. The processor 1004 is physically and electrically coupled to the board 1002. In some implementations the at least one communication chip 1006 is also physically and electrically coupled to the board 1002. In further implementations, the communication chip 1006 is part of the processor 1004.

Depending on its applications, computing device 1000 may include other components that may or may not be physically and electrically coupled to the board 1002. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 1006 enables wireless communications for the transfer of data to and from the computing device 1000. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1006 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 1000 may include a plurality of communication chips 1006. For instance, a first communication chip 1006 may be dedicated to shorter range wireless communications such as Wi-Fi and Bluetooth and a second communication chip 1006 may be dedicated to longer range wireless communications such as GPS, EDGE, GPRS, CDMA, WiMAX, LTE, Ev-DO, and others.

The processor 1004 of the computing device 1000 includes an integrated circuit die packaged within the processor 1004. The term "processor" may refer to any device or portion of a device that processes electronic data from registers and/or memory to transform that electronic data into other electronic data that may be stored in registers and/or memory. The communication chip 1006 also includes an integrated circuit die packaged within the communication chip 1006.

In various implementations, the computing device 1000 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 1000 may be any other electronic device that processes data.

Some embodiments may be provided as a computer program product, or software, that may include a machine-readable medium having stored thereon instructions, which may be used to program a computer system (or other electronic devices) to perform a process according to an embodiment. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

Figure 11:
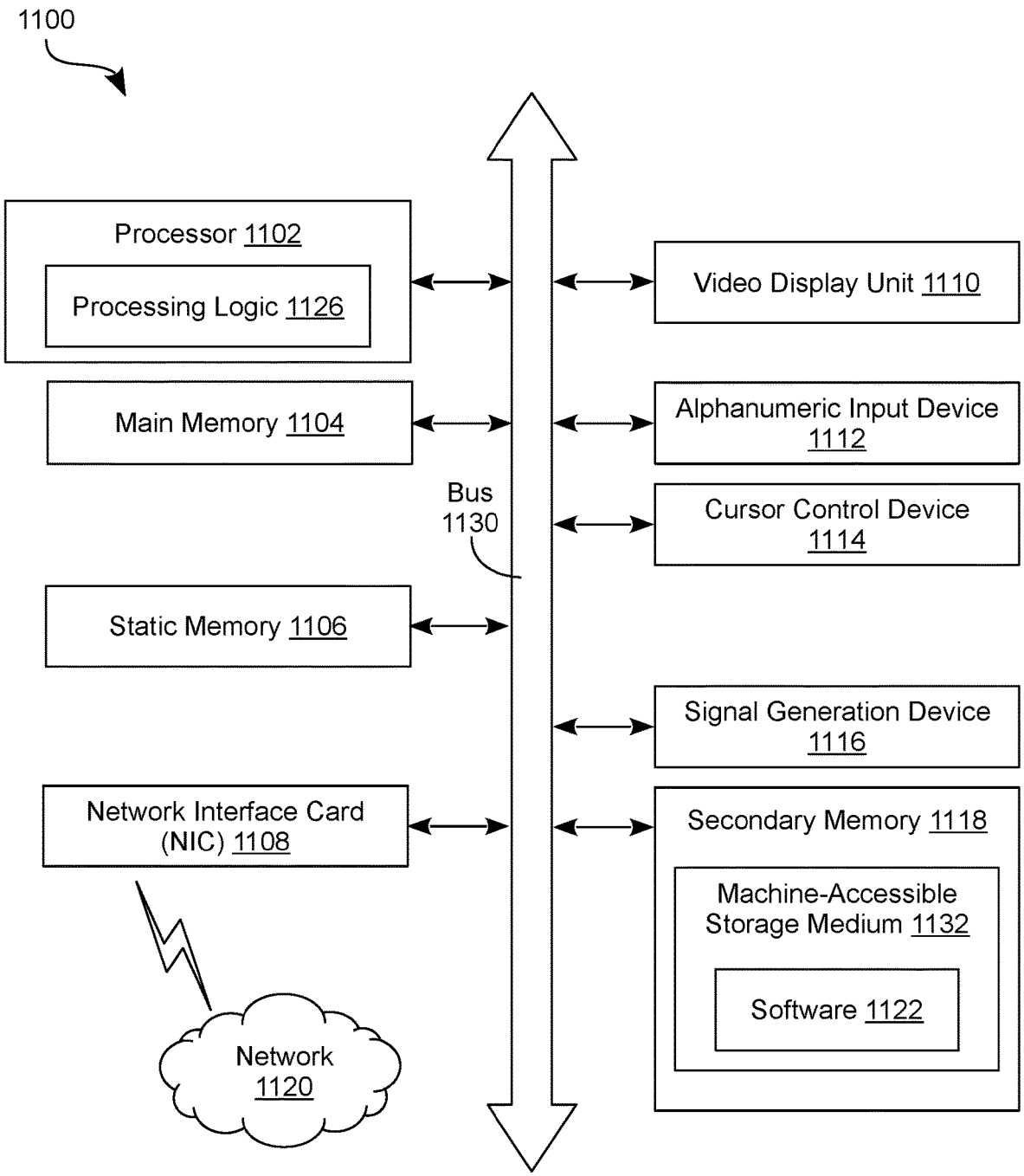
FIG. 11 is a functional block diagram illustrating an exemplary computer system, in accordance with one embodiment.

FIG. 11 illustrates a diagrammatic representation of a machine in the exemplary form of a computer system 1100 within which a set of instructions, for causing the machine to perform any one or more of the methodologies described herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary computer system 1100 includes a processor 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a secondary memory 1118 (e.g., a data storage device), which communicate with each other via a bus 1130.

Processor 1102 represents one or more general-purpose processing devices such as a microprocessor, central processing unit, or the like. More particularly, the processor 1102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1102 may also be one or more special-purpose processing devices such as an application specific integrated circuit (ASIC), a field programmable gate array (FPGA), a digital signal processor (DSP), network processor, or the like. Processor 1102 is configured to execute the processing logic 1126 for performing the operations described herein.

The computer system 1100 may further include a network interface device 1108. The computer system 1100 also may include a video display unit 1110 (e.g., a liquid crystal display (LCD), a light emitting diode display (LED), or a cathode ray tube (CRT)), an alphanumeric input device 1112 (e.g., a keyboard), a cursor control device 1114 (e.g., a mouse), and a signal generation device 1116 (e.g., a speaker).

The secondary memory 1118 may include a machine-accessible storage medium (or more specifically a computer-readable storage medium) 1132 on which is stored one or more sets of instructions (e.g., software 1122) embodying any one or more of the methodologies or functions described herein. The software 1122 may also reside, completely or at least partially, within the main memory 1104 and/or within the processor 1102 during execution thereof by the computer system 1100, the main memory 1104 and the processor 1102 also constituting machine-readable storage media. The software 1122 may further be transmitted or received over a network 1120 via the network interface device 1108.

While the machine-accessible storage medium 1132 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any of one or more embodiments. The term "machine-readable storage medium" shall accordingly be taken to include, but not be limited to, solid-state memories, and optical and magnetic media.

Techniques and architectures for saving processor state are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory.

These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A circuit device comprising:
    a first processor to couple to a first memory, wherein a first node is to comprise the first processor and the first memory, wherein the first processor comprises:
        a first cache to cache first data based on an execution of a software process by the first processor, the execution while the first node is coupled to a second node which comprises a second processor and a second memory, wherein, on behalf of the software process, the first node is to access second data at a memory location of the second memory, wherein the first data is to comprise a cached version of the second data, and wherein the first data corresponds to first address information which indicates the memory location of the second memory;
        first circuitry coupled to detect a power disruption event while the first data is cached at the first cache;
        second circuitry coupled to the first circuitry, wherein, based on the power disruption event, the second circuitry is to:
            interrupt a software execution pipeline of the first processor;
            terminate communications between the first node and the second node; and
            capture an image of a state of the first processor, comprising the second circuitry to flush the first cache to a reserved region of the first memory, wherein the second circuitry is to write both the first data and the first address information to the reserved region; and
        third circuitry to generate a signal after the image is captured, the signal to enable a shutdown of the first processor based on the power disruption event.

2. The circuit device of claim 1, wherein the first circuitry is to detect the power disruption event while third data is cached at the first processor, wherein the third data corresponds to second address information which represents a memory location of the first memory, wherein the second circuitry to flush the first cache further comprises the second circuitry to write both the third data and the second address information to the reserved region.

3. The circuit device of claim 1, further comprising the second node, wherein the first circuitry is to detect the power disruption event while third data is cached at the second processor, wherein the third data corresponds to second address information which indicates a second memory location of the first memory, wherein the second processor comprises:
    fourth circuitry which, responsive to an indication of the power disruption event, is to:
        interrupt a pipeline of the second processor;
        capture an image of a state of the second processor, comprising the fourth circuitry to flush a second cache of the second processor to a second reserved region of the second memory, wherein the fourth circuitry to flush the second cache comprises the fourth circuitry to write both the third data and the second address information to the second reserved region.

4. The circuit device of claim 1, wherein the second circuitry is to capture the image according to an allocation of multiple caches of the first processor each to a different respective sub-region of the reserved region.

5. The circuit device of claim 1, wherein the second circuitry to terminate the communications comprises the second circuitry to receive an acknowledgement that a link between the first node and the second node is blocked, wherein, responsive to the first circuitry, the second circuitry is further to flush the software execution pipeline of the first processor before the second circuitry is to capture the image.

6. The circuit device of claim 1, wherein the second circuitry to flush the first cache of the first processor to the reserved region comprises the second circuitry to preserve a relative order of data cached by respective lines of the cache.

7. The circuit device of claim 1, wherein any cached data which is to be flushed from the first processor to the second node is to be flushed independent of the power disruption event.

8. The circuit device of claim 1, wherein the first processor further comprises:
fourth circuitry to detect a boot-up of the first processor;
fifth circuitry, responsive to the fourth circuitry, to:
perform an access of the image at the reserved region; and
based on the access, to write the first data and the first address information to the first cache of the first processor.

9. The circuit device of claim 1, wherein the second circuitry to capture the image comprises the second circuitry to write the image to a volatile memory.

10. The circuit device of claim 9, wherein the second circuitry to capture the image further comprises the second circuitry to write the image to a non-volatile memory after the image is written to the volatile memory.

11. The circuit device of claim 1, further comprising:
fourth circuitry, coupled between a core of the first processor and the first memory, to perform a hash calculation, wherein the second circuitry is further to disable the fourth circuitry in response to the first circuitry, wherein the second circuitry is to capture the image while the fourth circuitry is disabled.

12. A system comprising:
a first node comprising:
a first memory; and
a first processor couple to the first memory, wherein the first processor comprises:
a first cache to cache first data based on an execution of a software process by the first processor, the execution while the first node is coupled to a second node which comprises a second processor and a second memory, wherein, on behalf of the software process, the first node is to access second data at a memory location of the second memory, wherein the first data is to comprise a cached version of the second data, and wherein the first data corresponds to first address information which indicates the memory location of the second memory;
first circuitry coupled to detect a power disruption event while the first data is cached at the first cache;
second circuitry coupled to the first circuitry, wherein, based on the power disruption event, the second circuitry is to:
interrupt a software execution pipeline of the first processor;
terminate communications between the first node and the second node; and
capture an image of a state of the first processor, comprising the second circuitry to flush the first cache to a reserved region of the first memory, wherein the second circuitry is to write both the first data and the first address information to the reserved region; and
third circuitry to generate a signal after the image is captured, the signal to enable a shutdown of the first processor based on the power disruption event; and a display device coupled to the first node, the display device to display an image based on the first data.

13. The system of claim 12, wherein the second circuitry is to capture the image according to an allocation of multiple caches of the first processor each to a different respective sub-region of the reserved region.

14. The system of claim 12, wherein the second circuitry to flush the first cache of the first processor to the reserved region comprises the second circuitry to preserve a relative order of data cached by respective lines of the first cache.

15. The system of claim 12, wherein the first processor further comprises:
fourth circuitry to detect a boot-up of the first processor;
fifth circuitry, responsive to the fourth circuitry, to:
perform an access of the image at the reserved region; and
based on the access, to write the first data and the first address information to the first cache of the first processor.

16. The system of claim 12, wherein the first node further comprises:
fourth circuitry, coupled between a core of the first processor and the first memory, to perform a hash calculation, wherein the second circuitry is further to disable the fourth circuitry in response to the first circuitry, wherein the second circuitry is to capture the image while the fourth circuitry is disabled.

17. A method at a circuit device, the method comprising:
detecting a power disruption event, the detecting while first data is cached at a first processor of a first node, wherein a first memory of the first node is accessible to the first processor, wherein the first node is coupled to a second node which comprises a second processor and a second memory, wherein the first data is cached at a first cache of the processor based on an execution of a software process by the first processor, wherein, on behalf of the software process, the first node accesses second data at a memory location of the second memory, wherein the first data is comprises a cached version of the second data, and wherein the first data corresponds to first address information which indicates the memory location of the second memory;
based on the detecting of the power disruption event:
interrupting a software execution pipeline of the first processor;
terminating communications between the first node and the second node;
capturing an image of a state of the first processor, comprising flushing the first cache to a reserved region of the first memory, wherein the flushing the first cache comprises writing both the first data and the first address information to the reserved region; and
generating a signal after the image is captured, the signal to enable a shutdown of the first processor based on the power disruption event.

18. The method of claim 17, wherein the image is captured according to an allocation of multiple caches of the first processor each to a different respective sub-region of the reserved region.

19. The method of claim 17, wherein flushing the first cache of the first processor to the reserved region preserves a relative order of data cached by respective lines of the first cache.

20. The method of claim 17, wherein any cached data which is flushed from the first processor to the second node is flushed independent of the detecting of the power disruption event.

21. The method of claim 17, further comprising:
    detecting a boot-up of the first processor;
    based on the detecting of the boot-up, restoring the state of the processor, including:
        accessing the image at the reserved region; and
        based on the accessing, writing the first data and the first address information to the first cache of the first processor.

22. The method of claim 17, further comprising:
    based on the detecting of the power disruption event, disabling a hash engine which is coupled between a core of the first processor and the first memory, wherein the image is captured while the hash engine is disabled.

* * * * *